Jan. 16, 1968     G. E. BLAKESLEE ET AL     3,363,806
DISPENSER HAVING A VIBRATOR FOR FACILITATING
THE FLOW OF BULK MATERIAL
Filed May 31, 1966
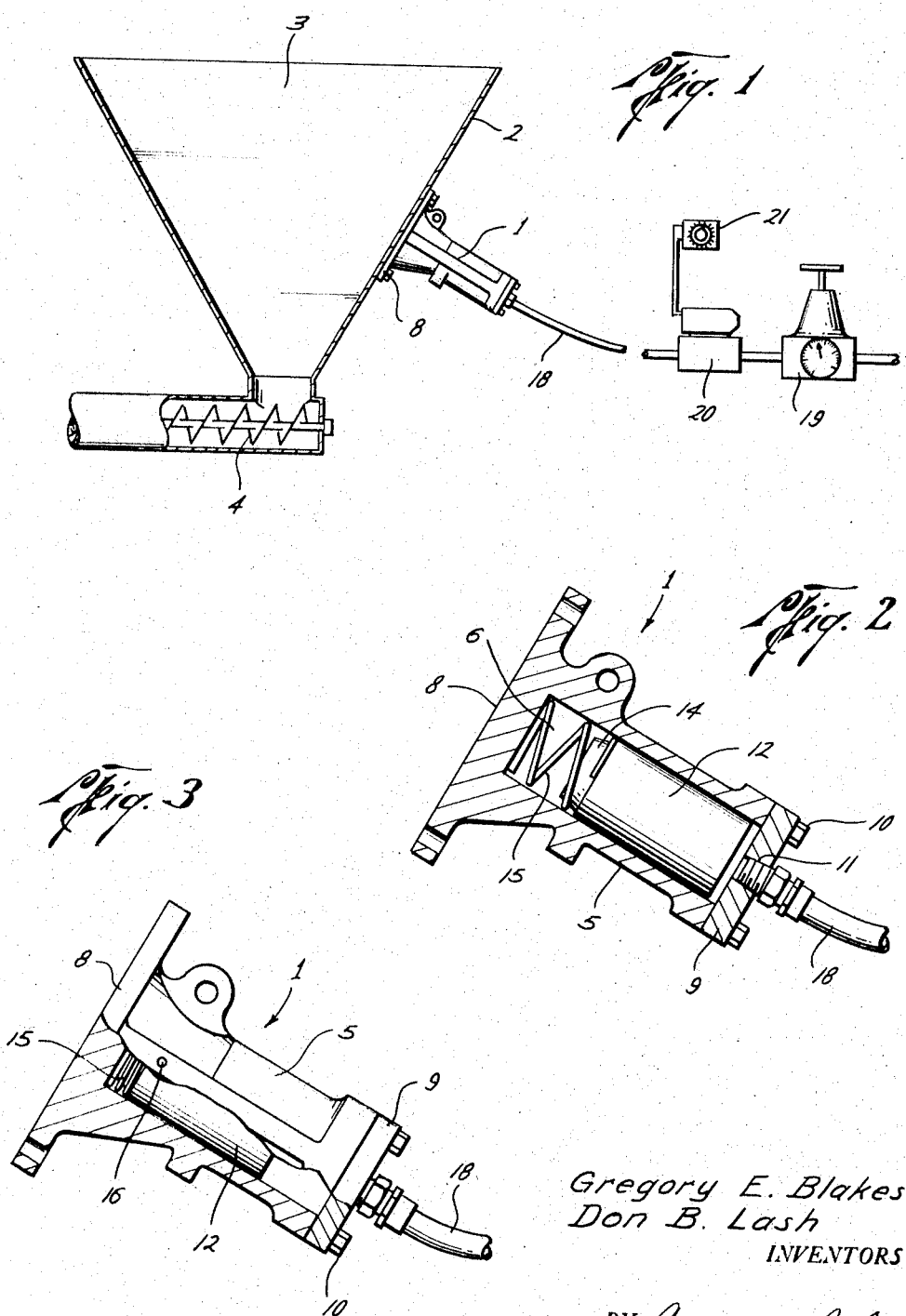
Gregory E. Blakeslee
Don B. Lash
INVENTORS
BY Arnold and Roylance
ATTORNEYS

United States Patent Office 3,363,806
Patented Jan. 16, 1968

3,363,806
DISPENSER HAVING A VIBRATOR FOR FACILITATING THE FLOW OF BULK MATERIAL
Gregory E. Blakeslee and Don B. Lash, Houston, Tex., assignors to National Air Vibrator Company, Houston, Tex., a corporation of Ohio
Filed May 31, 1966, Ser. No. 553,808
3 Claims. (Cl. 222—70)

ABSTRACT OF THE DISCLOSURE

A vibrator is provided for positioning against the side of a bin or receptacle to facilitate the movement of material stored therein. The vibrator contains a cylindrical chamber in which fluid enters to drive the piston into contact with the bin or receptacle. Timing means is operably connected with the vibrator so that the piston will strike the receptacle only at timed intervals.

---

This invention relates to a method and apparatus for facilitating the flow of bulk material. It is especially advantageous in assuring uniform flow of a bulk material from a receptacle such as a bin or hopper with a minimum amount of noise.

Receptacles or dispensers such as bins or hoppers are commonly used for handling or storage of grain or other food products, as well as various other bulk materials. When the material in such receptacles must be moved from them, it has been found desirable to aid such movement by the use of pneumatic vibrators. That is, a vibrator is placed in contact with one surface of a receptacle to be unloaded, and upon actuation of the vibrator the bulk material in the receptacle is caused to flow toward the exit point of said receptacle.

While vibrators have generally been quite satisfactory for such uses, several difficulties have been encountered which have prevented their use in many situations. For example, in the food processing industry, it is often necessary to employ a number of vibrators in a single plant. Each vibrator makes a loud noise each time its piston strikes the base. Since the prior art vibrators have been of the type wherein the piston continuously strikes the base, each vibrator therefore operates at an extremely high noise level. When it is recognized that a large number of vibrators are often necessary in a limited area, it is easily seen that many workers find the noise level intolerable.

In an effort to reduce the noise level at which vibrators operate, some vibrators have been constructed with air cushions at both ends of the piston chamber so that the piston does not contact a base or head plate. While such vibrators are quiet, they are grossly inefficient when compared with the noisier vibrators wherein the piston does strike a head plate.

The present invention provides a vibrator which is suitable for operation at regularly timed intervals so that, even though the piston strikes a base plate and thereby retains the efficiency of this feature, such striking occurs so seldom that an excessive noise level is not created. Use of the vibrators constructed in accordance with this invention provides a relatively uniform flow of bulk material from a receptacle while maintaining the noise level at a minimum. Therefore, a large number of such vibrators may be employed in a given area without causing an undue hardship on the workers. Still further, the present invention allows about a 98% saving in air consumption.

The distinctly advantageous features provided by this invention are obtained by the novel construction of the vibrator and vibrator assembly and method.

One embodiment of the invention is illustrated in the accompanying drawings which form a part of this specification and wherein:

FIGURE 1 is a pictorial side view, partially in section, illustrating a vibrator constructed in accordance with one embodiment of this invention positioned adjacent one surface of a bin, and connected to a system suitable for achieving the vibrator system and method in accordance to this invention.

FIGURE 2 is a side view partially in section, showing the piston of the vibrator in an initial position.

FIGURE 3 is a view similar to FIGURE 2, showing the piston in a second position.

Referring now to FIGURES 1 and 2, there is illustrated a vibrator 1 constructed in accordance with one embodiment of this invention positioned against one side of a funnel-shaped bin 2. The bin 2 may be of any type suitable for use in handling or storing a bulk material, and desirably includes an opening 3 in the top thereof, and an auger feed 4 in the bottom thereof for removing material from the bin.

The vibrator 1 is placed against the bin in such a manner that operation of the vibrator facilitates the flow of bulk material from the bin and prevents bridging of the material as it exits. Such a vibrator constructed in accordance with this invention may include a housing 5 which may be constructed of any suitable material, such as hard steel, and of any suitable size. In configuration, the housing of the FIGURES 1–3 embodiment is seen to be generally cylindrical with a generally cylindrical opening extending transversely therethrough. The wall of this opening defines the exterior of an elongate cylindrical chamber 6, the chamber 6 being of a size and shape convenient for receiving a cylindrical piston. At the end of the housing 5 which is adapted to be fitted adjacent the bin 2 is a somewhat disk-shaped base 8. The base 8 is integral with the housing 5, but it may be constructed as a separate piece; on the other hand, the base and housing may be constructed as one piece. One side of the base 8 abuts the bin 2, the other side defining the end of chamber 6.

Longitudinally opposite the base 8 in the illustrated housing 5 is a generally disk-shaped head plate 9. Here again, the head plate 9 could be constructed as a unit with the housing, although it will usually be preferred to construct the head plate as a separate piece. If it is so constructed as a separate piece, the head plate may be secured to the housing by any convenient fastening means, such as the bolts 10. The inner surface of head plate 9 defines an end of the chamber 6.

In the head plate 9, preferably centrally disposed therein, is an inlet opening 11 which allows fluid communication with the chamber 6 in housing 5. In this manner, air or other fluid may enter through the head plate into the chamber 6.

Slidingly disposed in the chamber 6 is a generally cylindrical piston 12, the piston being shorter in length than the chamber 6 so that the piston is free for movement from a first position removed from the base 8 to a second position abutting the base 8. In diameter, the piston 12 is slightly smaller than the inside diameter of the chamber 6, so that there is a very small annular area between the piston and the wall of chamber 6. For example, if the piston is four inches in diameter, the width of the annular area may be on the order of 0.004 inch.

The piston 12 is desirably constructed to taper at the end of the piston opposite the head plate to a portion 14 of smaller diameter than the main body of the piston thus forming a recessed portion at this end of the piston. The tapering portion of the recess formed by the piston is thus capable of conveniently receiving the end of resilient means such as the compression spring 15 which is disposed in the end of the chamber 6 adjacent the base 8.

Disposed in the housing 5 is at least one outlet opening or port 16 which allows fluid communication from the chamber 6 nearest the base 8. In this manner, the port 16 prevents air lock by allowing the air inside the chamber 6 adjacent the base 8 to be expelled or vented on the stroke of the piston toward the base, and at the same time allows the air used to drive the piston on that stroke to exit through the small annular space between the piston and the inside wall of chamber 6, and thence through the port 16.

Construction of the vibrator in this manner, that is by providing an inlet at one end of the piston chamber and a single outlet port near the other end of the chamber, allows construction of a vibrator system wherein the piston strikes the base only at selected time intervals. In this connection, it is noted that the length of the piston 12 is greater than the distance between the outlet opening 16 and the base 8. Accordingly, a slug of air entered to drive the piston against the base acts as a cushion to prevent instantaneous return of the piston to the FIG. 2 position. In this manner, the piston may be caused to strike the base only at selected time intervals, frequency vibrations of the piston being prevented by the cushioning effect.

In accordance with the present invention, novel means are provided for effecting actuation of vibrators such as that in the embodiment described above, at such selected timed intervals. Such means are illustrated schematically in FIGURE 1.

Generally, such means comprises an air line, valve means for controlling the flow of air through said air line, and timing means for actuating said valve means at selected time intervals.

The air line may comprise the air hose 18 which is connected at its one end to the opening 11 in the head plate 9 of vibrator 1, and at its other end to a suitable source of air under pressure (not shown). It is here noted that while the term "air" is used in this specification and the appended claims, other fluids under pressure may be equally satisfactory. Of course, for economic reasons air is generally preferred. A suitable gauge 19 may be included in the air hose 18 to measure the pressure of the air supply.

Located intermediate the source of air under pressure and the vibrator 1 along the air line is the valve means which in this embodiment is illustrated as the solenoid valve 20. The solenoid valve 20, or other suitable valve means, allows fluid communication, or fluid isolation, between the source of air under pressure and the vibrator 1.

Operably associated with the solenoid valve 20 is timing means such as the automatic timer 21. Any convenient type of timing device is suitable for this use, the exact construction and operation of such devices being well known to those skilled in the art. Through its operative association with the valve 20, the timer may periodically allow flow through the valve at only selected time intervals.

In operation, the timer 21 is set for any selected time interval, such as five seconds. With such a setting, the solenoid valve will be actuated once each five seconds allowing a slug of air to pass through the solenoid valve and thence through the air hose 18 and the opening 11 in head plate 9 into the piston chamber 6 of the vibrator, to drive the piston.

Because of the force exerted by the spring 15 on the end of the piston nearest the base 8, tending to move the piston away from the base 8, the piston 12 assumes an initial position removed from the base 8, that position being illustrated in FIGURE 2. (It is noted that, when the vibrator is positioned as in FIGURES 1, 2, and 3 an additional force of gravity also acts to move and retain the piston 12 to the above-stated initial position.)

Entry of a slug of air through the head plate acts to force the piston 12 from this initial or first position to a second position (FIGURE 3) abutting the base 8 at its wall which defines the end of chamber 6. This process, of course, compresses the spring 15 and forces the air which occupied the end of chamber 6 nearest the base 8 out the port 16. It will be understood that movement of the piston 12 from the first position to the second position is practically instantaneous, and the piston 12 strikes the base 8 with considerable force, thus facilitating the flow of material in the bin 2.

Action of the spring 15, and gravity in the FIGURES 1, 2 and 3 orientation, then forces the piston gradually back to its initial position. The slug of air which drove the piston against the base 8 exits through the port 16 via the small annular space around the periphery of piston 12, between the piston 12 and the inner wall of the housing 5 which defines the wall of chamber 6. Return of the piston 12 all the way back to its initial position is cushioned by the slug of air which drove the piston after the piston has reached the FIG. 3 position, and may typically take on the order of three to four seconds. Frequency vibrations of the piston are thereby prevented.

The timer 21 then actuates additional strikes of the piston in the same manner. As is evident, the timer may be set for any suitable time cycle, regular or irregular. That which has been found most advantageous in many contexts of use is a regular time cycle of from about four seconds to about six seconds.

It is thus seen that the invention has provided a novel vibrator construction which allows operation of the vibrator at selected time intervals. The invention has further provided a vibrator system and method suitable for use in the removal of bulk materials from receptacles such as bins or hoppers at a uniform rate and at a minimum noise level. Further, the invention provides a vibrator system which allows a substantial reduction in air consumption costs.

While the invention has been described in terms of a particularly useful embodiment, it will be understood by those skilled in the art that various structural changes may be made in such illustrated embodiment without departing from the scope of the invention, which is defined by the appended claims. For example, various configurations of chamber and piston may be employed, just so long as the piston length and cross-sectional area requirements are met in order to provide for vibration only at selected time intervals.

We claim:

1. A vibrator in combination with a dispenser, suitable for use in removing bulk material from said dispenser with a minimum of noise, comprising:

a base adapted to engage a surface of said dispenser;

a housing integral with said base, said housing defining therein an elongate piston chamber;

a piston reciprocally movable in said chamber from a first position removed from said base to a second position abutting said base, whereby the impact of said piston on said base is effective to cause the bulk material in said dispenser to flow;

an inlet opening at the end of said chamber longitudinally opposite said base for introducing fluid into said piston chamber to drive said piston from said first position to said second position;

an outlet opening in said chamber near said base, for allowing said fluid to be expelled from said chamber after said piston has reached said second position;

the cross-sectional area of said piston being just slightly smaller than the cross-sectional area of said chamber, so that fluid under pressure may flow longitudinally in said piston chamber around the periphery of said piston between the piston and the wall of said chamber;

the length of said piston being greater than the distance between said outlet opening and said base, so that said piston is cushioned on its return from said second position to said first position by the slug of fluid introduced to drive the piston, to prevent frequency vibrations of said piston; and, means for introducing a slug of fluid into said inlet opening only at selected time intervals.

2. A vibrator in accordance with claim 1, wherein the end of said piston adjacent said base contains a recessed portion for receipt of resilient means, and wherein resilient means are connected between said recessed portion and said base, whereby said piston is biased in a position spaced from said base to facilitate return of said piston from said second position to said first position.

3. A vibrator in accordance with claim 1, wherein said means for introducing a slug of fluid into said inlet opening comprise a valve, and a timer for actuating said valve only at selected time intervals.

References Cited

UNITED STATES PATENTS

| 1,225,699 | 5/1917 | Brown | 222—249 |
| 1,245,603 | 11/1917 | Lewis | 259—29 |
| 1,605,096 | 11/1926 | Campbell | 259—29 |
| 2,800,252 | 7/1957 | Wahl | 222—413 |
| 2,868,357 | 1/1959 | Thomas | 198—220 |
| 1,107,001 | 3/1963 | Olenik | 222—70 |

FOREIGN PATENTS 1,107,001  5/1961  Germany.

WALTER SOBIN, *Primary Examiner.*